May 22, 1928.  
D. W. STUBBS  
1,670,597  
SCALE  
Filed March 1, 1926  
2 Sheets-Sheet 1
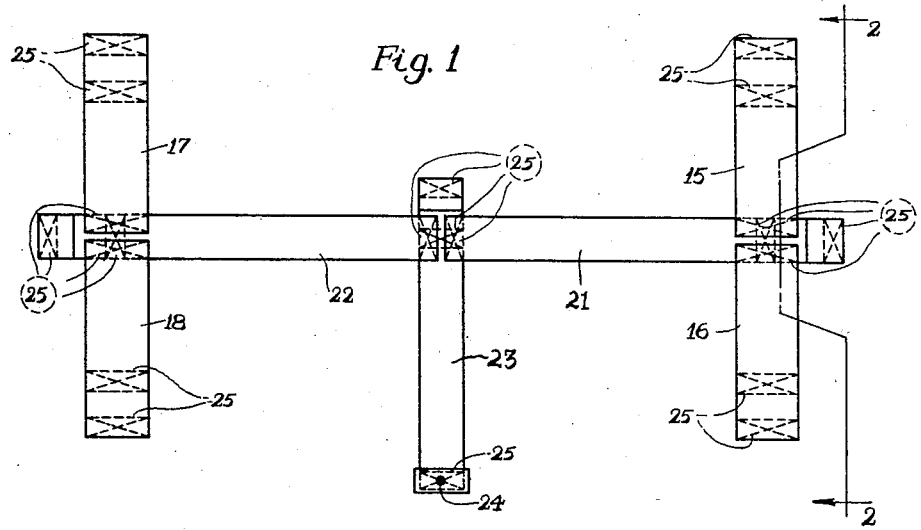
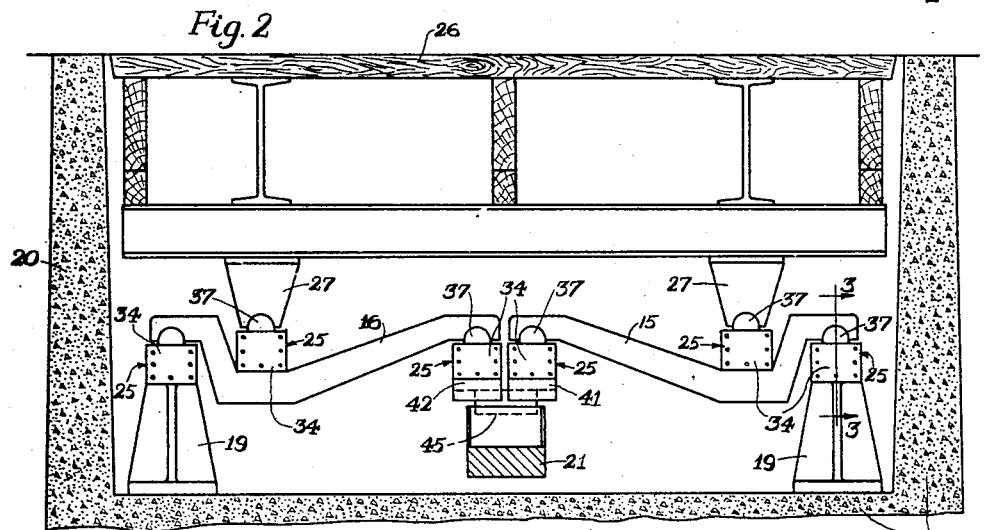
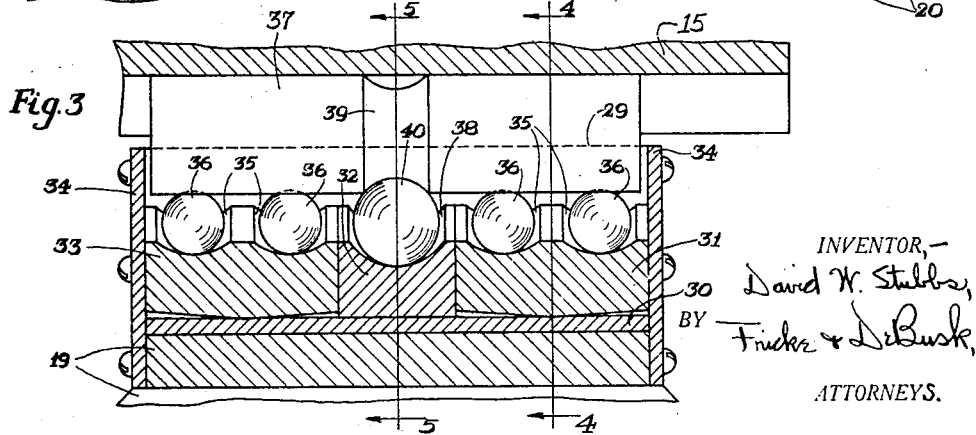
INVENTOR,—  
David W. Stubbs,  
BY Fricke & DeBusk,  
ATTORNEYS.

May 22, 1928.
D. W. STUBBS
SCALE
1,670,597
Filed March 1, 1926     2 Sheets-Sheet 2
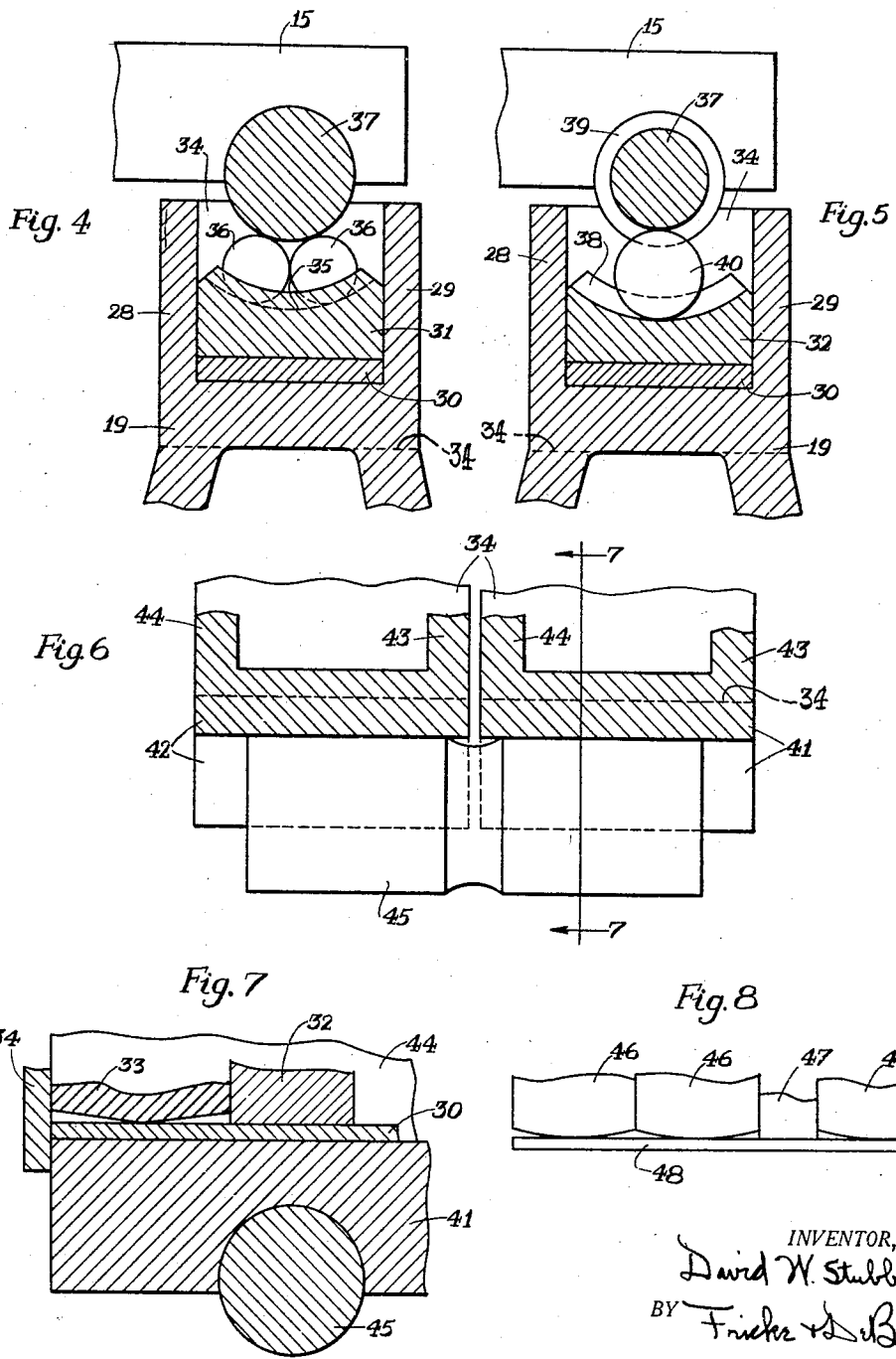

Patented May 22, 1928.

1,670,597

UNITED STATES PATENT OFFICE.

DAVID W. STUBBS, OF CHICAGO, ILLINOIS.

SCALE.

Application filed March 1, 1926. Serial No. 91,385.

My invention relates to scales, and it has for one of its objects the provision of a new and improved form and arrangement of supports and connections for the several levers and associated parts by which the effect of friction may be almost if not entirely eliminated; by reason of which a scale when once adjusted for accurate weighing may be maintained in proper working condition without constant attention, adjustment and repair; by reason of which a scale designed for weighing very heavy loads may operate with fair accuracy for weighing even a comparatively light load; by reason of which the installation and initial adjustment of a scale may be effected with the maximum ease; and whereby scales may be improved in sundry details as will appear from the following description.

In the drawings, in which the preferred form of my improved scale mechanism is illustrated,—

Fig. 1 is a diagrammatic plan view of the levers for supporting a platform scale.

Fig. 2 is a vertical sectional view taken substantially at line 2—2 of Fig. 1, and showing also the supports for the levers together with the platform mounted thereon.

Fig. 3 is an enlarged detail view, showing one of my improved bearing arrangements, being substantially a section taken at line 3—3 of Fig. 2.

Figs. 4 and 5 are vertical sections taken substantially at lines 4—4 and 5—5 of Fig. 3.

Fig. 6 is a central vertical section through the plate or bracket interposed between one of the levers and the end portions of two superposed levers, the bracket being partially broken away, and certain other parts being also shown.

Fig. 7 is a vertical section, also partially broken away, being taken substantially at line 7—7 of Fig. 6; and Fig. 8 is a view showing a modified form of construction.

Referring to several figures of the drawings, in which corresponding parts are indicated by the same reference characters,—15 and 16 indicate the main levers at one end of a scale and 17 and 18 indicate the main levers at the opposite end of the scale. Each of these levers is supported at its outer end by a stand 19 preferably in the form of a casting rising from the foundation or floor of the scale pit, the pit in the construction shown being indicated as provided by the use of concrete walls 20. 21 and 22 indicate the end extension levers which are supported at their outer ends by suitable stands such as the stand 19, the lever 21 having a bearing upon the bottom faces of the inner end portions of the main levers 15 and 16, and the lever 22 having a bearing upon the bottom faces of the inner ends of the main levers 17 and 18. The inner ends of the end extension levers 21 and 22, in turn, bear upon the upper face of a transverse lever 23, one end of which transverse lever is supported by a stand such as that indicated by 19 in Fig. 2, the other end of the transverse lever being connected by a rod 24 with the balancing and indicating mechanism above the pit 20 in the usual manner. The bearings for each of the levers upon its supporting stand, and the bearings of each of the levers upon the associated levers are of the special type forming a part of the subject-matter of my invention and hereinafter described. Each of these bearings is indicated in Figs. 1 and 2 by the numeral 25, the several bearings being arranged in the same general manner in each of the numerous instances.

A platform 26 of any suitable type is supported by means of standards 27 and bearings 25 from the main levers, as is clearly indicated in Fig. 2.

Referring now particularly to Figs. 3, 4 and 5 for a detailed description of one of the bearings 25, 28 and 29 indicate vertically disposed plates rising in spaced relation from the upper end of the stand 19, in the construction shown being formed integrally with the stand. Between the plates 28 and 29, there is mounted a plate 30 formed of lead or other soft metal serving as a support for bearing blocks 31, 32 and 33 which are held in position between the plates 28 and 29 by means of end plates 34 which are secured in position by means of machine screws. As is clearly shown in Fig. 3, each of the blocks 31 and 33 is beveled slightly upon its bottom face so as to be able to rock slightly with respect to the plate 30. Each of these blocks is provided in its upper face with two ball races 35 in each of which are mounted two bearing balls 36. In the bottom face of the part to be supported by the balls 36, which in the present instance is the outer end of the main lever 15, there is mounted a cylindrical part 37 which is adapted to rest upon the balls 36, with two of the balls of each of said blocks upon one side of the axis of the cylindrical part 37 and with the other two balls upon the opposite side of the axis. The races 35 are formed circularly so as to be concentric with the axis of the cylindrical portion 37, as is clearly shown in Fig. 4. The races are also formed circularly transversely of the races, as is indicated in Fig. 3. The result is that the bearings are automatically self-centering and the axis about which the relative movement occurs is held in fixed position under all conditions. By reason of the beveled arrangement of the bottom faces of the bearing blocks 31 and 33, the pressure upon the balls in one of the races is automatically equalized with that upon the balls in the other race, the block being adapted to swing longitudinally of the cylindrical part 37 to the slight extent necessary for such equalization.

The intermediate bearing block 32 is provided with a race 38 which is also formed concentrically about the cylindrical part 37, a groove or race 39 being formed also in the face of the cylindrical part 39 directly opposite the race 38. A single ball 40 of a size considerably larger than the balls 36 is employed in the race 38, the ball 40 being provided primarily for the purpose of holding the bearing parts against movement relative to each other longitudinally of the cylindrical part 37. The block 32 is not beveled upon its bottom face and is accordingly not adapted to rock longitudinally of the cylindrical part 37, but the block is adapted to be depressed slightly with respect to the soft metal plate 30 so far as may be necessary for equalizing the pressure between the several supporting balls 36 and 40.

In the use of my improved bearing, I contemplate placing in the housings provided by the plates 28, 29 and 34 a supply of oil or other suitable agent for protecting the bearing parts against rusting, the oil to stand in the housings at such a level as to completely cover the ball 40.

As above described, the cylindrical part 37 is carried by the lever 15, with the remaining bearing parts mounted upon the stand 19. In the structure immediately to the left in Fig. 2 of the bearing above described, the cylindrical part 37 is mounted upon the standard 27, while the remaining parts of the bearing are mounted upon the upper face of the lever 15. It will be understood that the arrangement in any particular case is to be varied to the slight extent necessary for meeting the conditions of that case. It is believed that it is unnecessary further to illustrate or describe such construction, inasmuch as the principles involved are the same.

In Figs. 6 and 7, I have illustrated the upper two housings 41 and 42 which hold the bearings for the upper levers at the points where two levers are supported by a single lever. In this construction, each housing is in the form of a casting comprising a bottom plate, vertically disposed walls 43 and 44 formed integrally with the bottom plate, and separately formed end plates 34, the arrangement being such that the housings are adapted to hold a supply of oil about the bearings supporting the cylindrical parts 37 of the upper levers. The housings 41 and 42 are provided on their bottom faces with a cylindrical part 45 with which the housings have a pivotal connection, the part 45 being supported by bearings carried by the lower lever as above described, the part 45 corresponding with the cylindrical part 37.

In Fig. 8, I have illustrated diagrammatically a modified form of construction in which two bearing blocks 46 are provided at each side of the intermediate block 47, each of the bearing blocks 46 being substantially the same as the bearing blocks 31 and 32, except that the bottom faces of the blocks are curved slightly instead of being beveled. The curvature has substantially the same effect of permitting the rocking of the blocks as that described above in connection with the beveled blocks. In this construction, the use of a soft metal plate or pad 48 for supporting the blocks is even more important than in connection with the construction as illustrated in the remaining figures, since there is more likelihood of necessity for equalization between the several blocks than is the case when only three blocks are employed as shown in Fig. 3.

By use of my construction in which a plurality of bearing blocks are provided for supporting the balls in contact with the cylindrical parts 37 and 45, the effect of any possible warping in the operation of hardening the bearing blocks is very materially lessened. By the use of the beveled or curved bottom face feature of the bearing blocks and the use of the soft metal plates upon which the bearing blocks are mounted, I am enabled much more easily and quickly to install and adjust a scale for obtaining accurate results than could be done where these features were not used.

By the use of my improved means for protecting the bearings from rust, I am enabled to provide a construction which is adapted to remain in good working order indefinitely, since the wear upon the bearing parts is by this means kept to a minimum and the parts are kept clean so as to have the proper co-operation for a substantially frictionless support of the parts.

While I prefer to employ the construction as illustrated in the drawing and as above described, it will be understood that I do not wish to be limited to the details of the construction set forth except so far as the claims are so restricted by the state of the art inasmuch as it will be evident that changes may well be made in the form and arrangement of parts without departing from the spirit of my invention.

I claim:

1. A scale comprising a lever, a second member bearing on said lever, a horizontally-disposed part having a substantially cylindrical bottom face portion carried by one of said members, and two rows of balls carried by the other member on opposite sides of the axis of said cylindrical part adapted by themselves to support one of said members from the other member.

2. A scale comprising a lever, a second member bearing on said lever, a horizontally-disposed part having a substantially cylindrical bottom face portion carried by one of said members, and bearing balls mounted on the other member in races centered both axially and longitudinally with respect to said cylindrical part adapted by themselves to support one of said members from the other member.

3. A scale comprising a lever, a second member bearing on said lever, a horizontally-disposed part having a substantially cylindrical bottom face portion carried by one of said members, a plurality of ball race devices carried by the other of said members, and balls mounted in the races of said devices and bearing against said cylindrical part adapted by themselves to support one of said members from the other member.

4. A scale comprising a lever, a second member bearing on said lever, a horizontally-disposed part having a substantially cylindrical bottom face portion carried by one of said members, a plurality of segmental ball race devices carried by the other of said members and having races concentric with the cylindrical part, and balls mounted in the races and bearing against said cylindrical part adapted by themselves to support one of said members from the other member.

5. A scale comprising a lever, a second member bearing on said lever, a horizontally-disposed part having a substantially cylindrical bottom face portion carried by one of said members, a plurality of segmental ball race devices carried by the other of said members and having races concentric with the cylindrical part and also rounded longitudinally of the cylindrical part, and balls mounted in the races and bearing against said cylindrical part adapted by themselves to support one of said members from the other member.

6. A scale comprising a lever, a second member bearing on said lever, a horizontally-disposed part having a substantially cylindrical bottom face portion carried by one of said members, a bearing block carried by the other of said members and having two ball races arranged concentrically with respect to the cylindrical part, and balls mounted in the races and bearing against said cylindrical part adapted by themselves to support one of said members from the other member.

7. A scale comprising a lever, a second member bearing on said lever, a horizontally-disposed part having a substantially cylindrical bottom face portion carried by one of said members, a bearing block carried by the other of said members and having two ball races arranged concentrically with respect to the cylindrical part, and two balls mounted in each of the races and bearing against said cylindrical part, said four balls being adapted by themselves to space the bearing block away from the cylindrical part.

8. A scale comprising a lever, a second member bearing on said lever, a horizontally-disposed part having a substantially cylindrical bottom face portion carried by one of said members, two bearing blocks carried by the other of said members opposite the end portions of the cylindrical part and each having two ball races arranged concentrically with respect to the cylindrical part, and balls mounted in the races and bearing against said cylindrical part adapted by themselves to support one of said members from the other member.

9. A scale comprising a lever, a horizontally-disposed part having a substantially cylindrical bottom face portion carried by the lever, ball bearings for supporting said cylindrical part, and a housing for maintaining a supply of oil in and about said bearings.

10. A scale comprising a lever, a second member bearing on said lever, a horizontally-disposed part having a substantially cylindrical bottom face portion carried by one of said members, two rows of balls carried by the other member on opposite sides of the axis of said cylindrical part adapted by themselves to support one of said members from the other member, and a housing for maintaining a supply of oil about and above said balls.

11. A scale comprising a lever, a second member bearing on said lever, a horizontally-disposed part having a substantially cylindrical bottom face portion carried by one of said members, two rows of balls carried by the other member on opposite sides of the axis of said cylindrical part adapted by themselves to support one of said members from the other member, and means for equalizing the pressure between said cylindrical part and the several balls.

12. A scale comprising a lever, a second member bearing on said lever, a horizontally-disposed part having a substantially cylindrical bottom face portion carried by one of said members, a bearing block carried by the other of said members and having two ball races arranged concentrically with respect to the cylindrical part, balls mounted in the races and bearing against said cylindrical part adapted by themselves to support one of said members from the other member, and means for equalizing the pressure of the balls in one race with that of the balls in the other race.

13. A scale comprising a lever, a second member bearing on said lever, a horizontally-disposed part having a substantially cylindrical bottom face portion carried by one of said members, a bearing block carried by the other of said members and having two ball races arranged concentrically with respect to the cylindrical part, and balls mounted in the races and bearing against said cylindrical part adapted by themselves to support one of said members from the other member, said block being adapted to have a slight swinging motion longitudinally of the cylindrical part for equalizing the pressure of the balls in one race with that of the balls in the other race.

14. A scale comprising a lever, a second member bearing on said lever, a horizontally-disposed part having a substantially cylindrical bottom face portion carried by one of said members, a bearing block carried by the other of said members and having two ball races arranged concentrically with respect to the cylindrical part, and balls mounted in the races and bearing against said cylindrical part adapted by themselves to support one of said members from the other member, said block being provided with a high point on its face opposite that in which the races are located for permitting the block to swing longitudinally of the cylindrical part for equalizing the pressure of the balls in one race with that of the balls in the other race.

15. A scale comprising a lever, a second member bearing on said lever, a horizontally-disposed part having a substantially cylindrical bottom face portion carried by one of said members, two bearing blocks carried by the other of said members opposite the end portions of the cylindrical part and each having two ball races arranged concentrically with respect to the cylindrical part, and balls mounted in the races and bearing against said cylindrical part adapted by themselves to support one of said members from the other member, each of said blocks being adapted to have a slight swinging motion longitudinally of the cylindrical part for equalizing the pressure of the balls in one race with that of the balls in the other race.

16. A scale comprising a lever, a second member bearing on said lever, a horizontally-disposed part having a substantially cylindrical bottom face portion carried by one of said members, a bearing block carried by the other of said members and having two ball races arranged concentrically with respect to the cylindrical part, balls mounted in the races and bearing against said cylindrical part adapted by themselves to support one of said members from the other member, and a yielding pad interposed between the bearing block and the member upon which it is mounted adapted to permit the block to swing slightly longitudinally of the cylindrical part for equalizing the pressure of the balls in one race with that of the balls in the other race.

17. A scale comprising a lever, a part having a substantially cylindrical bottom face portion, a ball bearing device interposed between the cylindrical part and the lever for supporting said cylindrical part, two other levers extending over said cylindrical part, and a ball bearing device interposed between the cylindrical part and each of said last named two levers.

18. A scale comprising a lever, a plate above said lever, a part having a substantially cylindrical bottom face portion carried by said plate on its bottom face, balls interposed between said cylindrical part and said lever, a second lever extending over said plate, a second part having a substantially cylindrical bottom face portion carried by said second lever on its bottom face, and balls interposed between the plate and said second cylindrical part.

19. A scale comprising a lever, two plates above said lever, a part having a substantially cylindrical bottom face portion carried by said plates on their bottom faces and rotatable with respect to one of the plates for permitting it to rock with respect to the other plate, bearing balls interposed between said cylindrical part and said lever, two other levers extending over said plates respectively, other parts having substantially cylindrical bottom face portions carried by said last named levers respectively on their bottom faces, and bearing balls interposed between each of the plates and the superposed cylindrical part.

20. A scale comprising a lever, two plates above said lever, a part having a substantially cylindrical bottom face portion carried by said plates on their bottom faces and rotatable with respect to one of the plates for permitting it to rock with respect to the other plate, bearing blocks mounted on the lever and having ball races opposite said cylindrical part, balls in said races bearing against said cylindrical part, two other levers extending over said plates respectively, a part having a substantially cylindrical bottom face portion carried by each of said last named levers on its bottom face, bearing blocks mounted on said plates below each of said last named cylindrical parts and having ball races therein, and balls in said races bearing against said two cylindrical parts.

21. A scale comprising a lever, two plates above said lever, a part having a substantially cylindrical bottom face portion carried by said plates on their bottom faces and rotatable with respect to one of the plates for permitting that plate to rock with respect to the other plate, bearing blocks mounted on the lever and having ball races opposite said cylindrical part, balls in said races bearing against said cylindrical part, two other levers extending over said plates respectively, a part having a substantially cylindrical bottom face portion carried by each of said last named levers on its bottom face at right angles with respect to the position of the first named cylindrical part, bearing blocks mounted on said plates below each of said last named cylindrical parts and having ball races in their upper faces, and balls in said races bearing against said two cylindrical parts.

22. A scale comprising a lever, a second lever extending at one end over said first named lever, a plate between said two levers, a ball bearing device between said plate and one of said levers and arranged with its axis extending transversely of the lever, and a second ball bearing device between the plate and the other lever and arranged with its axis at right angles with respect to the axis of the first named ball bearing device.

23. A scale comprising a lever, a second lever extending at one end over said first named lever, a plate between said two levers, horizontally-disposed cylindrical parts at right angles to each other on opposite faces of the plate, balls interposed between one of said cylindrical parts and the plate, and other balls interposed between the other cylindrical part and one of the levers.

24. In a scale, the combination of a horizontally disposed member having a substantially cylindrical bottom face portion, a plurality of separately formed bearing blocks below said member and provided with races substantially concentric with the curvature of said member, and anti-friction devices interposed in said races between said member and said blocks for supporting said member.

25. In a scale, the combination of a horizontally disposed member having a substantially cylindrical bottom face portion, a plurality of separately formed bearing blocks below said member and provided with races concentric with the curvature of said member, and two anti-friction devices in the bottom portions of said races between said member and said blocks at opposite sides of the axis of the cylindrical member for supporting said member.

26. In a scale, the combination of a lever, a second lever extending over said first named lever, a plate between said two levers, a part having a substantially cylindrical bottom face portion carried by said plate on its bottom face in transverse position with respect to said first named lever, anti-friction devices interposed between said cylindrical part and said first named lever, a second part having a substantially cylindrical bottom face portion carried by said second lever on its bottom face in transverse position with respect to said second lever, and anti-friction devices interposed between said second cylindrical part and said plate.

27. In a scale, the combination of a horizontally disposed member having a substantially cylindrical bottom face portion, a plurality of separately formed bearing blocks below said member and provided with races concentric with the curvature of said member, and anti-friction devices in the bottom portions of said races between said member and said blocks for supporting said member, said cylindrical member being grooved for the reception of at least one of said anti-friction devices for holding the cylindrical member against movement longitudinally of itself with respect to said bearing blocks.

28. In a scale, the combination of a horizontally disposed member having a substantially cylindrical bottom face portion with a concentric groove therein, a plurality of separately formed bearing blocks below said member and provided with races concentric with the curvature of said member, and anti-friction devices interposed in said races in snug engagement with said cylindrical member for supporting said member, at least one of said anti-friction devices being in engagement with said groove for holding the cylindrical member against movement longitudinally of itself with respect to said bearing blocks.

DAVID W. STUBBS.